P. BONVILLAIN & E. RONCERAY.
PROCESS FOR MAKING PATTERN AND STRIPPING PLATES.
APPLICATION FILED APR. 22, 1907.

910,166.  Patented Jan. 19, 1909.

UNITED STATES PATENT OFFICE.

PHILIBERT BONVILLAIN AND EUGÈNE RONCERAY, OF PARIS, FRANCE, ASSIGNORS TO THE E. H. MUMFORD COMPANY, OF PHILADELPHIA, PENNSYLVANIA, A CORPORATION OF PENNSYLVANIA.

PROCESS FOR MAKING PATTERN AND STRIPPING PLATES.

No. 910,166.   Specification of Letters Patent.   Patented Jan. 19, 1909.

Application filed April 22, 1907. Serial No. 369,685.

*To all whom it may concern:*

Be it known that we, PHILIBERT BONVILLAIN and EUGÈNE RONCERAY, two citizens of the Republic of France, residing at Paris, in France, have invented certain new and useful Improvements in Processes for Making Pattern and Stripping Plates, of which the following is a specification.

The invention relates to the process of making pattern plates and stripping plates consisting of metallic shells; and has for its principal objects; the provision of a process whereby the molder alone can quickly and accurately form the desired plates; and the provision of a process wherein the pattern plate and the necessary stripping plates may be simultaneously formed. The steps of the process are illustrated in the accompanying drawings, wherein:—

Figures 1 to 10 inclusive illustrate the steps of the process,

Figure 1:
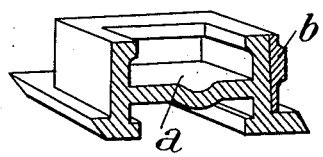

Referring to the first figure of the drawing, the process will be described as applied to the formation of pattern and stripping plate to be subsequently used in machine molding for forming sand molds corresponding to the upper surface of the pattern $a$, it being understood that the pattern and stripping plates for the formation of the lower face of the object is secured in a manner similar to the one described for the upper surface. This pattern $a$ has a removable side face $b$ to facilitate the drawing.

Figure 2:
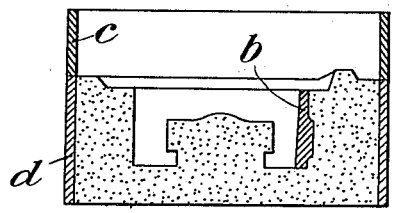
Figure 3:
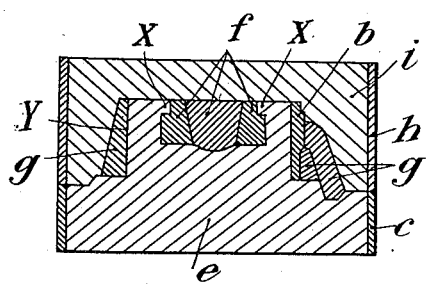
Figure 4:
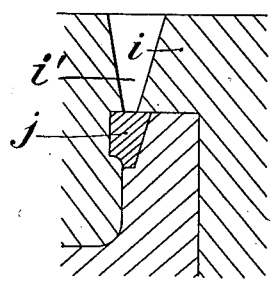
Figure 5:
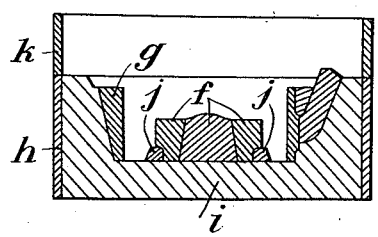
Figure 6:
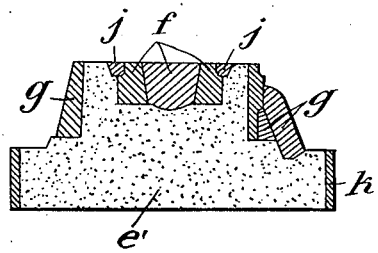
Figure 7:
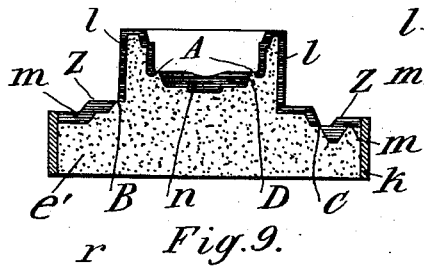

The first step in the process is the formation of the sand mold shown in Figure 2, which sand mold is formed from the upper surface of the pattern $a$ in any desired manner. A flask $c$ is then placed upon the flask $d$ and the mold is filled with plaster, thus forming the plaster cast $e$ shown in Figure 3. The next step in the process is the formation of the removable sections $g$ and $f$, which removable sections are made of any desirable composition which will harden, such as plaster, and are placed in position about those surfaces of the cast $e$ from which it would be difficult to draw a second plaster cast. The sections $f$ and $g$ are molded to the proper shape by the use of any desired instrument or means, but preferably by hand. After the removable section $f$ and $g$ have been built up about the plaster cast $e$, the second plaster cast $i$ is cast into a flask $h$ which is placed upon the flask $c$. It will be seen that the plaster cast $i$ may be very easily withdrawn from the cast $e$ with its built up surrounding sections. After the cast $i$ is removed those portions of the cast $e$ which are marked $x$ are cut away, pouring holes $i$ (Figure 4) are cut in the cast $i$ in position to supply material to the cut-out portions, and small plaster sections $j$ are poured into the mold to take the place of the cut-away sections $x$. In this manner removable sections are provided of those portions of the cast $e$ which would otherwise prevent a draw. The cast $i$ is then reversed in position as indicated in Figure 5, the sections $f$, $j$ and $g$ placed therein, a flask $k$ placed on top of the flask $h$ and a sand mold is rammed into the cavity thus prepared. The flasks are then reversed and the flask $h$ with its cast $i$ removed, leaving the sand mold $e'$ of Figure 6 with the removable sections $f$, $j$ and $g$ resting thereon. It will be noted that the sand mold $e'$ when taken without the removable sections $j$ constitute an exact reproduction of the plaster cast $e$. This sand mold $e'$ is then cut down a slight amount, the sections $f$, $j$ and $g$ being removed as the cutting progresses, the mold finally being trimmed down to the size shown in Figure 7, the dark portions of such figure indicating the amount which the mold is cut down. At the points B C and D which constitute the line of division between the stripping plates and the pattern plates which are to be formed, very little cutting is done and this in the slanting direction shown. This cutting is facilitated by covering the surface of the mold with chalk preliminary to the cutting, and then removing all the whitened surface except along the lines D and C. A flask $o$ is then placed over the flask $c$ of Figure 3, and a sand mold is taken from the cast $e$, the removable sections $j$ as heretofore described facilitating such molding operation. This mold is then placed over the mold of Figure 7 (see Figure 8) and metal is poured into the mold thus formed to give the shell-like pattern plate $l$ and stripping plates $m$ $m$ and $n$. It will be seen that the whole process has been directed to the formation of a pair of sand molds in which stripping plates and a pattern plate may be cast suitable for molding a surface similar to that of the upper part of the pattern $a$ of Figure 1. It will also be seen that the pattern plate $l$ is joined to the stripping plates $m$, $m$ and $n$ along very thin lines, so that they may be easily separated from each other by means of a chisel. If desired the mold may be formed adjacent the joining lines B, D and C with small grooves so that an additional amount of metal $t$ may be applied at these points (Figure 8) in order to facilitate pouring. The stripping plates and the pattern plate thus formed may be used in any desired manner in a molding machine.

Figure 8:
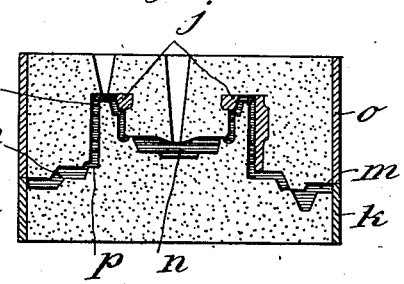
Figure 9:
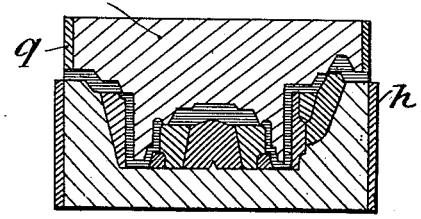
Figure 10:
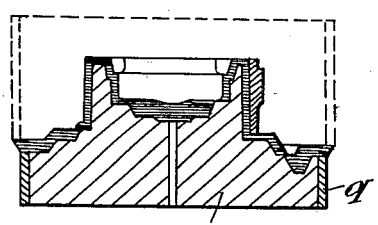

A supporting backing for the shell-like stripping plates and pattern plate may be applied in the manner indicated in Figures 9 and 10. The cast $i$ (Figure 5) is utilized for this purpose, the various removable sections $f$, $g$ and $j$ being placed therein together with the shell cast as shown in Figure 8. Upon the parts as so arranged (Figure 9) a plaster backing $r$ is cast, thus giving the plaster backing $r$ with the inclosing shell of metal as indicated in Figure 10.

Figure 11:
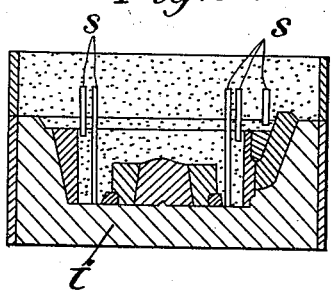
Figures 11 and 12 illustrate certain of the steps of a modified process.
Figure 12:
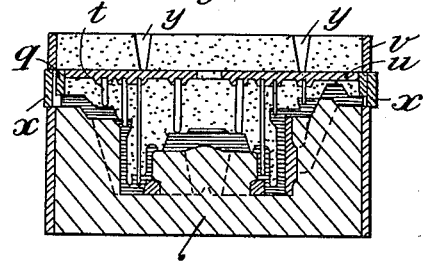
Figure 13:
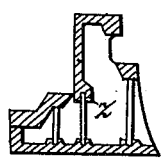
Figure 13 is a section through a partial pattern plate and stripping plate formed by the modified process.

In some cases it is desirable to support the stripping plates and pattern plate upon posts instead of upon the plaster back $r$ as shown in Figure 10, and in such case the process is slightly changed as indicated in Figures 11 and 12. In carrying out this changed process the plaster cast $i$ of Figure 5 is again utilized. The removable sections $f$, $g$ and $j$ are placed in this cast together with the supporting posts $s$, and the sand is rammed into the cavity as indicated in Figure 11. The process is then carried out precisely as heretofore indicated with respect to Figures 7 and 8, the only difference in result being that after the step of Figure 8, a cast metal shell corresponding to that of Figure 8 is secured, in which the posts $s$ are embedded in the metal shell at one of their ends as indicated in Figure 12. The parts are then all assembled in a cast $i$ corresponding to such cast in Figure 9, and a section $x$ placed upon the flask of such cast as shown in order to increase the height of the flask, and sand is packed into the cavity thus prepared, such sand taking the place of the plaster $r$ in the steps illustrated in Figure 9. At the top of the section $x$ a space $u$ is left for the reception of the plaster which is to form the plate engaging the ends of the posts, and the additional posts $t$ are put into position. After this a flask section $v$ is placed in position upon the top of the section $x$, and plaster is poured through the openings $y$, thus forming the plate shown in which the upper ends of all the posts are embedded. The plaster also flows down the edges at $q$ and forms a support for the edges of the stripping plates. In this manner a base plate is secured in which are mounted a series of posts for supporting the sections of the stripping plates and the pattern plate, such support taking the place of the plaster $r$ of Figure 10.

Having thus described our invention and illustrated its use, what we claim as new and desire to secure by Letters Patent is the following:—

1. Process of making pattern plates which consists in making an impression of the pattern in sand, making a plaster cast from the impression, applying removable sections to parts of the cast difficult to draw, making a second plaster cast from the plaster cast thus built up, making sand molds from the two casts with the removable sections, cutting down one of the sand molds to give the thickness desired in the pattern plate and then casting the pattern plate.

2. Process of making pattern plates which consists in making an impression of the pattern in sand, making a plaster cast from the impression, applying removable sections to parts of the cast difficult to draw, making a second plaster cast from the plaster cast thus built up, making a sand mold from the second plaster cast with the sections applied thereto, removing the sections and cutting down the face of the sand mold an amount equal to the thickness of the pattern plate to be made, making a sand mold from the first plaster cast, fitting the two sand molds together and then casting the pattern plate.

3. Process of making pattern plates and the stripping plate therefor which consists in making an impression of the pattern in sand, making a plaster cast from the impression, applying removable sections to parts of the cast difficult to draw, making a second plaster cast from the plaster cast thus built up, making a sand mold from the second plaster cast with the sections applied thereto, removing the sections and cutting down the face of the sand mold an amount equal to the thickness desired in the pattern and stripping plates, making a sand mold of the first plaster cast, fitting the two molds together, casting the plates and then separating the pattern and stripping plates.

4. Process of making pattern plates and the stripping plates therefor which consists in making an impression of the pattern in sand, making a plaster cast from the impression, applying removable sections to parts of the cast difficult to draw, making a second plaster cast from the plaster cast thus built up, making a sand mold from the second plaster cast with the sections applied thereto, removing the sections and cutting down the face of the sand mold an amount equal to the thickness desired in the pattern and stripping plates, the thickness of the sand removed at the points of juncture of such parts being reduced to permit of the easy separation of the parts, making a sand mold of the first plaster cast, fitting the two molds together, casting the plates and then separating the pattern and stripping plates.

5. Process of making pattern plates which consists in making an impression of the pattern in sand, making a plaster cast from the impression, applying removable sections to parts of the cast difficult to draw, making a second plaster cast from the plaster cast thus built up, making sand molds from the two casts with the removable sections, cutting down one of the sand molds to give the thickness desired in the pattern plate and then casting the pattern plate and finally filling the shell thus cast with plaster to form a support therefor.

6. Process of making pattern plates which consists in making an impression of the pattern in sand, making a plaster cast from the impression, arranging removable sections about the parts of the cast from which an impression cannot be easily drawn, making a second plaster cast from the first cast thus built up, cutting out sections of the first cast so shaped and located as to prevent a draw, replacing such cut-out portions with removable sections, making sand molds from the two casts using the various removable sections, cutting down one of the sand molds to give the thickness desired in the pattern plate, fitting the sand molds together and casting the pattern plate.

In testimony whereof we have affixed our names to this specification in the presence of two subscribing witnesses.

PHILIBERT BONVILLAIN.
EUGÈNE RONCERAY.

Witnesses:
H. C. COXE,
JULIEN CAVERNE.